United States Patent [19]
Wreede

[11] Patent Number: 4,799,746
[45] Date of Patent: * Jan. 24, 1989

[54] EFFICIENT HOLOGRAMS AND METHOD FOR MAKING SAME

[75] Inventor: John E. Wreede, Monrovia, Calif.

[73] Assignee: Hughes Aircraft Company, Los Angeles, Calif.

[*] Notice: The portion of the term of this patent subsequent to Aug. 18, 2004 has been disclaimed.

[21] Appl. No.: 706,059

[22] Filed: Feb. 27, 1985

[51] Int. Cl.$^4$ ............................................. G03H 1/02
[52] U.S. Cl. .................................. 350/3.6; 350/320; 430/1; 430/2
[58] Field of Search ............... 430/1, 2; 350/3.6, 3.61, 350/3.7, 320

[56] References Cited

U.S. PATENT DOCUMENTS

| | | | |
|---|---|---|---|
| 2,947,626 | 8/1960 | Famely et al. | 96/34 |
| 3,012,886 | 12/1961 | Lerner . | |
| 3,940,204 | 2/1976 | Withrington . | |

FOREIGN PATENT DOCUMENTS

| | | |
|---|---|---|
| 0043993 | 1/1982 | European Pat. Off. . |
| 2249364 | 5/1975 | France . |
| 57-19084 | 2/1983 | Japan . |
| 1371121 | 10/1974 | United Kingdom . |

OTHER PUBLICATIONS

*Nouvelle Revue d'Optique*, vol. 4, No. 5, Dec. 1973; J. J. Clair et al.: "Etude Experimentale des Proprietes Optiques des Photoresines; Etude et Analyse de Phenomenes Lies a la preexposition", pp. 353–355.
*IEEE Journal of Quantum Electronics*, vol. QE-4, No. 11, Nov. 1968; A. Mikaelian et al.; "Holograms on Photochromic Films", pp. 757–762.
*Applied Optics*, vol. 18, No. 14, Jul. 15, 1979, B. Chang et al.: "Dichromated Gelatin for the Fabrication of Holographic Optical Elements", pp. 2407–2417.
*Photographic Science and Engineering*, vol. 28, No. 5, Oct. 1984 (Easton, PA, US), S. Sjolinder; "Swelling of Dichromated Gelatin Film", pp. 180–184.
*Applied Optics*, vol. 10, No. 3, Mar. 1971, K. Biedermann: "Attempts to Increase the Holographic Exposure Index of Photographic Materials", pp. 584–595.
*Optics Communications*, vol. 43, No. 2, Sep. 1982, R. Syms et al. "Noise Gratings in Photographic Emulsions", pp. 107–110.
*Applied Physics*, vol. 10, No. 1, May 1976, S. Case et al.: "Index Modulation and Spatial Harmonic Generation in Dichromated Gelatin Films", pp. 41–51.
*Proceedings of the SPIE*, vol. 215, "Recent Advances in Holography", 1980, published by SPIE (Palos Verdes, California, U.S.), S. McGrew: "Color Control in Dichromated Gelatin Reflection Holograms", pp. 24–31.
*Optics and Laser Technology*, vol. 5, No. 4, Aug. 1973; R. McPhedran: "Profile Formation in Holographic Diffraction Gratings", pp. 166–171.

*Primary Examiner*—Bruce Y. Arnold
*Attorney, Agent, or Firm*—Leonard A. Alkov; A. W. Karambelas

[57] ABSTRACT

Light sensitive recording medium is exposed to highly absorbed incoherent light either before or after a slant fringe hologram is recorded therein to reduce the sensitivity of the medium at surface regions adjacent a supporting substrate. The fringes recorded in the area of reduced sensitivity have lower contrast than those recorded in the remainder of the medium, freeing the fringes from the substrate and allowing greater expansion of the medium during a subsequent chemical swelling process. The increased swelling amplifies the refractive index modulation in the medium to increase the diffraction efficiency of the hologram. Dye may be added to the medium to increase absorbance of the incoherent light.

11 Claims, 2 Drawing Sheets

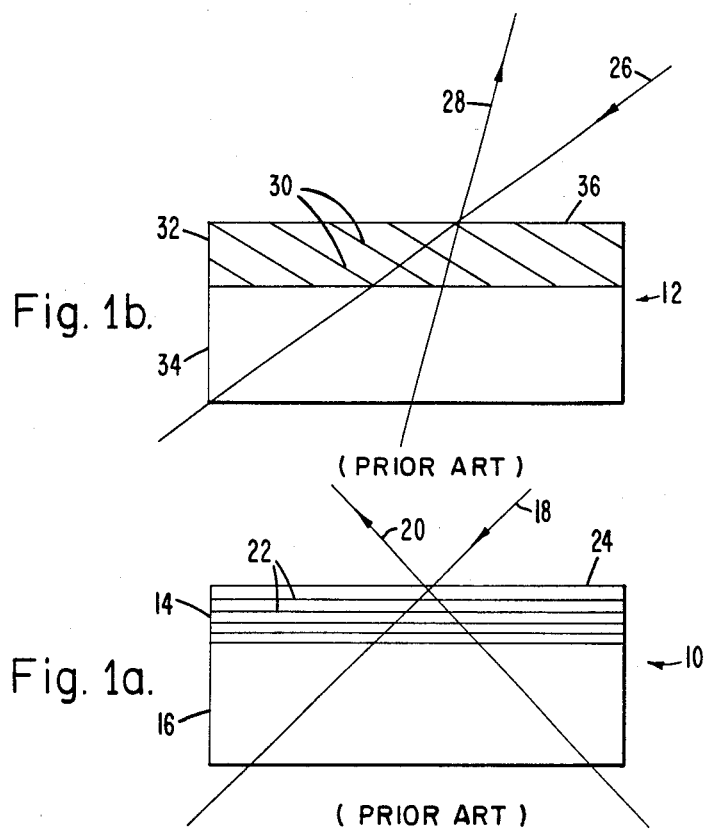
Fig. 1b. (PRIOR ART)
Fig. 1a. (PRIOR ART)
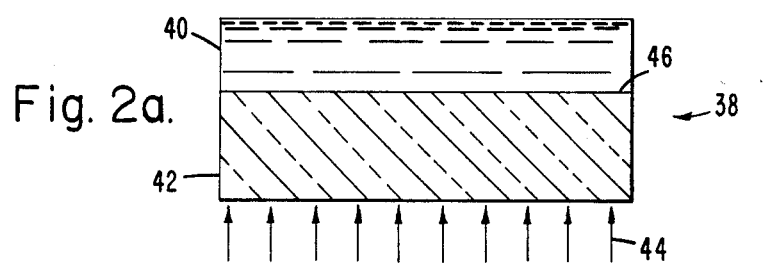
Fig. 2a.

EFFICIENT HOLOGRAMS AND METHOD FOR MAKING SAME

BACKGROUND OF THE INVENTION

This invention relates generally to holography and more particularly has reference to slant fringe holograms having increased efficiency and a method for making the same.

A hologram is a diffraction optical element which generally consists of a thin layer of photoreactive gelatin (e.g., dichromated gelatin) typically mounted on a glass substrate. The gelatin is exposed to intersecting laser beams which set up an interference pattern That pattern is recorded in the gelatin as a sinusoidal modulation in the index of refraction A pattern of holographic fringes corresponding to the refractive index modulation defines the hologram After the fringes are recorded, the gelatin is subjected to a chemical swelling procedure which amplifies the refractive index modulation to increase the diffraction efficiency of the hologram A hologram acts as a wavelength and direction sensitive optical filter. Incident light within a predetermined range of wavelengths and directions will be diffracted by the hologram into a predetermined pattern and direction. For light significantly outside those wavelengths or directions, the hologram will act as a transparent piece of glass.

Holograms have many uses.

In modern aircraft, both military and commercial, a hologram is used in the combiner element of the head-up display. A head-up display provides relevant symbology, such as flight data and weapons aiming information, superimposed on the pilot's forward field of view. The symbology is generated on a cathode ray tube and projected through a relay lens to a transparent combiner element located between the pilot's eyes and the aircraft windscreen. The combiner includes a holographic film which diffracts the projected symbology to the pilot's eyes while simultaneously affording him an unobstructed view through the combiner to the outside world. See, U.S. Pat. No. 3,940,204 to Roger J. Withrington.

Holograms are also used in visors designed to protect eyes from damaging light exposure, such as might be encountered from an incoming laser beam. A holographic element in the visor diffracts and redirects incoming laser light out of the wearer's field of vision. By suitable control of the light used to generate the hologram (angles, wavelengths, etc.), the degree of reflectivity/transmissivity of the hologram can be selectively determined and a cone of total reflection for a given wavelength can be provided to protect the wearer's eyes from damaging incident light. It is essential that the hologram be nearly 100% efficient in diffracting the damaging light so that it does not reach the eye. With an extremely intense beam, such as a laser beam, inefficiently diffracted light may enter the cone of protection and be sufficient to damage the wearer's eyes.

It is usually desirable to construct a hologram with zero degree fringes, i.e., fringes that are parallel to the surface of the gelatin. However, in some cases, physical design restraints prevent the substrate holding the gelatin layer from being shaped in conformity with the desired fringe pattern. In those cases, the fringes intersect the surface of the gelatin to form a slant fringe pattern. One problem with slant fringe patterns is that their diffraction efficiency is inherently lower than corresponding zero degree fringe patterns. The problem compounds in holograms used in head-up displays because the fringe angle, and consequently the diffraction efficiency, often varies across the combiner.

There is no previously known technique for making slant fringe holograms having the very high efficiencies obtainable in zero degree fringe hologram. Any of the known procedures for making higher efficiency zero degree fringe holograms will produce increased efficiencies when applied to slant fringe holograms. Such procedures include optimizing exposure levels, processing temperatures, processing solutions, gelatin moisture content, dichromate concentration, beam ratios, gelatin thickness and gelatin types. However, slant fringe holograms will always have a lower efficiency than corresponding zero degree fringe holograms.

It is apparent that any application where diffraction efficiency (either in absolute value or uniformity across the format) is of importance, such as head-up displays, and in which optical design dictates slant fringes, would benefit from a technique which gives slant fringe holograms an efficiency approaching that of zero degree fringe holograms.

SUMMARY OF THE INVENTION

The present invention overcomes the deficiencies of the prior art by providing a technique for making slant fringe holograms having increased efficiencies approaching that of zero degree fringe holograms.

One explanation for the phenomenon of lower efficiency in slant fringe holograms is that the reacted gelatin forming the ends of the fringes is anchored to the glass substrate and does not allow sufficient expansion of the gelatin during the chemical swelling process. A dichromated gelatin hologram (15 micron thick gelatin layer) with fringes parallel to the substrate can be easily processed to an efficiency of 99.99% reflection (measured as less than 0.01% transmission). A similar gelatin film exposed such that the fringes are at an angle of 10° to the substrate will have an efficiency of only 99.9% or less (corresponding to 0.10% transmission).

In the present invention, the ends of the interference fringes in a thin layer adjacent the surface of the rigid substrate are reduced in contrast by reducing the sensitivity of the dichromated gelatin in that area. The fringes are thus freed from the substrate, allowing the gelatin to expand naturally during the chemical swelling process. The increased swelling amplifies the refractive index modulation in the gelatin, resulting in a hologram having increased diffraction efficiency.

In one embodiment, the sensitivity of the photoreactive gelatin recording medium is reduced adjacent the substrate by exposing the medium to highly absorbed incoherent light before the fringe pattern is recorded therein. In another embodiment, the incoherent exposure occurs after the fringe pattern is recorded in the medium. In yet another embodiment, a dye is added to the medium to increase absorbance of the incoherent light.

Objects of the invention are, therefore, to provide an improved hologram and, more specifically, to provide a slant fringe hologram having improved diffraction efficiency.

Another object of the invention is to provide an improved method for making slant fringe holograms.

Still another object of the invention is to provide a slant fringe hologram having a diffraction efficiency useful in a holographic head-up display.

A further object of the invention is to provide an improved holographic head-up display.

Yet another object of the invention is to provide a method for making slant fringe holograms having increased efficiency comprising applying a layer of light sensitive holographic recording medium to a substrate, treating said layer to reduce light sensitivity at only surface regions thereof adjacent said substrate, said treating comprising exposing the medium to highly absorbed incoherent light, and exposing the recording medium to coherent light to record a slant fringe pattern therein.

A further object of the invention is to provide a method for increasing efficiency in slant fringe holograms comprising applying a layer of light sensitive holographic recording medium to a substrate, treating said layer to reduce light sensitivity at surface regions thereof adjacent said substrate, said treating comprising exposing the medium to highly absorbed incoherent light, exposing the recording medium to coherent light to record a slant fringe pattern therein, and swelling the recording medium.

A still further object of the invention is to provide a slant fringe hologram having increased efficiency comprising a substrate and a layer of holographic recording medium mounted on said substrate, said layer having a slant fringe pattern recorded therein, the fringe pattern at only surface regions of the medium adjacent the substrate being substantially reduced in contrast from the fringe pattern in the interior of the holographic medium.

These and other and further objects and features of the invention are apparent in the disclosure which includes the above and below specification and claims and drawings.

BRIEF DESCRIPTION OF THE DRAWINGS

FIGS. 1a and 1b are, respectively, a cross-sectional schematic representation of a hologram having zero degree fringes and a cross-sectional schematic representation of a slant fringe hologram.

FIG. 2a is a cross-sectional schematic representation of a method for making a hologram in accordance with the present invention.

DESCRIPTION OF THE PREFERRED EMBODIMENTS

Figure 2B:
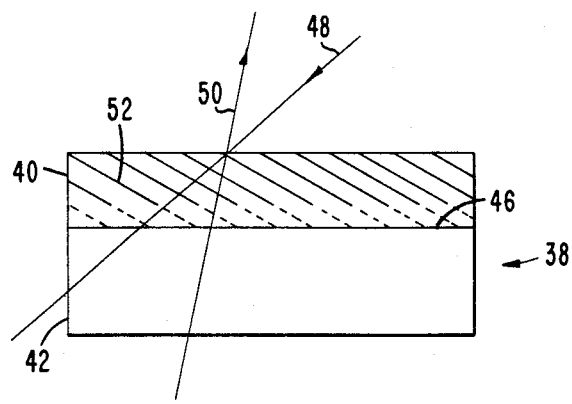
FIG. 2b is a cross-sectional schematic representation of a slant fringe hologram of the present invention.

Referring to FIGS. 1a and 1b, a conventional zero degree fringe hologram and a conventional slant fringe hologram are generally indicated by the numerals 10 and 12 respectively.

The zero degree fringe hologram 10 includes a layer of photoreactive gelatin 14, typically dichromated gelatin (usually 0.020 M ammonium dichromate—8% gelatin; approximately 6-15 microns thick in a head-up display or 15-25 microns thick in a laser eye protection device) applied to the surface of a rigid substrate 16, typically glass. Intersecting beams 18 and 20 of coherent light, such as laser light, pass through the gelatin 14 to set up an interference pattern therein. The light reacts with the gelatin 14, differentially exposing the gelatin in a manner dictated by the interference pattern. Exposed gelatin is cross-linked and becomes harder than unexposed gelatin, causing the gelatin layer 14 to have a refractive index which varies or modulates throughout its volume. The areas of maximum refractive index define a pattern of fringes 22 which characterize the nature and function of the hologram.

The fringes 22 are called zero degree fringes because they are parallel to the surface 24 of the gelatin layer 14. The orientation of the fringes 22 is determined by the angular relationship between the gelatin surface 24 and the construction beams 18 and 20. Zero degree fringes are formed when the construction beams have equal angles of incidence.

The slant fringe hologram 12 is generally similar to the zero degree fringe hologram described above in that intersecting construction beams 26 and 28 of coherent light record a pattern of fringes 30 in a layer of photoreactive gelatin 32 applied to the surface of a rigid substrate 34. However, the construction beams 26 and 28 have different angles of incidence and thus produce slanted fringes which intersect the gelatin surface 36.

In simple terms, the fringe pattern recorded in a hologram contains all the information needed to reproduce the construction beams. A hologram exposed to a beam of light corresponding to one of the construction beams will recreate and produce a second beam of light corresponding to the other of the construction beams. When exposed to a beam of light having a wavelength or direction significantly different from either of the construction beams, the hologram will act as a transparent piece of glass. Hence, a hologram can be used as a wavelength and direction sensitive optical filter.

The holograms 10 and 12 shown in FIGS. 1a and 1b are called reflection holograms because the construction beams 18, 20 and 26, 28 travel in opposite directions. If the construction beams had been traveling in the same direction, a transmission hologram would have been produced. The principles of the present invention are equally applicable to transmission and reflection holograms.

In making holograms, the gelatin is first exposed to coherent light in the manner described above and is then subjected to a number of processing steps which are well known in the art. During processing, the gelatin is swollen in a water solution and is then rapidly dehydrated with isopropyl alcohol. Hardened exposed gelatin swells less than soft unexposed gelatin, thus amplifying the difference in refractive index. The diffraction efficiency of the hologram is directly related to the amplitude of the refractive index modulation. Diffraction efficiency is a measure of the effectiveness of the hologram as an optical filter.

It is well known that slant fringe holograms have inherently lower efficiency than zero degree fringe holograms. One possible explanation for the loss of efficiency in slant fringe holograms is that the exposed hardened gelatin abutting the substrate becomes firmly attached to the substrate during exposure, thus inhibiting the swelling of the gelatin during the chemical processing steps. The present invention isolates the hardened exposed gelatin from the substrate by interposing a softer material during recording, thus allowing the gelatin to swell freely during subsequent chemical processing. The result is a slant fringe hologram having increased diffraction efficiency.

The product and process of the present invention are shown in FIGS. 2a and 2b.

Referring to FIG. 2a, a hologram recording structure 38 includes a layer 40 of photoreactive material, such as dichromated gelatin, applied to the surface of a rigid substrate 42, such as glass. The substrate side of the structure 38 is evenly irradiated with incoherent light 44 which passes through the substrate 42 into the photoreactive layer 40. The wavelength of the incoherent light 44 is selected for high absorbance by the photoreactive material so that the light penetrates only a short distance into the recording layer 40. A dye may be included in the layer 40 to increase the light absorbance of the material. In the case of dichromated gelatin, the dichromate itself may serve as the dye if the proper wavelength (e.g., 3660 Angstroms) is selected for the incoherent light 44.

In a typical embodiment, a dichromated gelatin layer 40 (approximately 15 microns thick containing approximately $3 \times 10^{17}$ molecules ammonium dichromate per $cm^2$) is exposed to incoherent light 44 from a filtered mercury arc lamp (not shown). The incoherent illumination can be within the range of 2000-5000 Angstroms, preferably 3660 Angstroms, and within a range from 70-420 millijoules per square cm. The optical absorbance of the layer at 3660 Angstroms is 5.2. The 3660 Angstrom energy is reduced to 5% of the incident level within 3.2 microns of the gelatin/glass interface 46.

The incoherent light reduces the dichromate ions, hardening the gelatin and making it less sensitive to light in the affected areas. Thus, the unreacted dichromated gelatin available for subsequent hologram exposure is approximately 12 microns or less thick with a gradual lowering of sensitivity over the bottom 3.2 microns of the recording layer 40.

Referring to FIG. 2b, construction beams 48 and 50 record a slant fringe pattern 52 in the photoreactive gelatin 40 in the manner described above. The construction beams 48 and 50 typically have a wavelength of 5145 Angstroms so that their optical absorbance in the photoreactive layer 40 is about 0.06. Consequently, the construction beams 48 and 50 produce a high contrast fringe pattern 52 in the upper region of the photoreactive layer 40 which has been unaffected by the incoherent light 44 and produce a low contrast fringe pattern in the lower region of the photoreactive layer 40 which has been desensitized by the incoherent light 44. The fringe contrast decreases through the desensitized area, approaching zero in a thin layer adjacent the surface 46 of the substrate 42. That thin layer is soft compared to the rigid substrate 42 and serves to isolate the ends of the fringe pattern 52 from the substrate 42. The recorded gelatin 40 thus swells freely when subjected to the conventional chemical processing steps described above.

Figure 3:
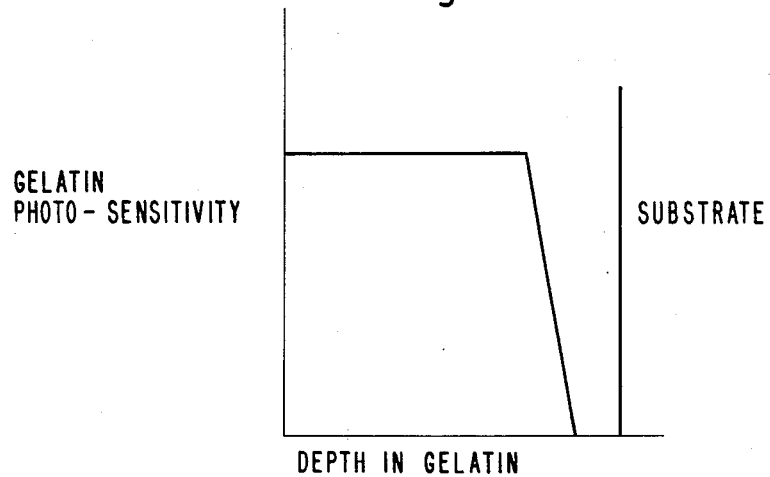
FIG. 3 is a graphical representation of the sensitivity profile of the structure shown in FIG. 2b.

FIG. 3 shows the photosensitivity profile for the hologram recording structure 38 of the present invention. The sensitivity level is high throughout the upper regions of the photoreactive layer 40. The sensitivity level in the lower region of the layer 40 decreases gradually to zero at a point a short distance from the interface between the photoreactive layer 40 and the substrate 42. It remains at zero throughout the thin layer immediately adjacent the substrate 42.

A conventional slant fringe hologram having a 10° slant angle has been shown to have a maximum efficiency of about 99.97%. Slant fringe holograms made in accordance with the present invention on similar samples have achieved efficiencies as high as 99.997%. Results have shown an average improvement of about 0.5 absorbance units because the incoherent exposure effectively decreases the thickness of the hologram and thus inherently reduces its efficiency.

The present invention contemplates use of the incoherent exposure described above either before or after a fringe pattern is recorded in the photoreactive layer. If the incoherent exposure occurs prior to recording, the sensitivity of the recording medium is reduced as described above to prevent the recording of a high contrast fringe pattern in the region adjacent the substrate. If the incoherent exposure occurs after the recording, the high contrast fringe pattern recorded in the photoreactive layer adjacent the substrate is blurred to produce a low contrast fringe pattern resembling that produced by the pre-exposure technique.

The increased efficiencies achieved by the present invention make the resultant holograms particularly well suited for use in head-up displays where high efficiency slant fringe holograms are often needed. However, the present invention is generally applicable to all slant fringe holograms and is not limited to those used in head-up displays.

In addition, the present invention is not limited to the specific desensitization technique described above. The present invention contemplates use of any technique known in the art which is capable of reducing the sensitivity of the recording medium in surface regions adjacent the substrate. General techniques for desensitizing dichromated gelatin for purposes different from the present invention are described in copending applications Ser. No. 684,645, entitled "Side Lobe Suppression in Hologram" now U.S. Pat. No. 4,687,720 by John E. Wreede and James A. Arns, and Ser. No. 684,538, entitled "Flare Reduction in Holograms" by Mao-Jin Chern and John E. Wreede, now abandoned.

While the invention has been described with reference to specific embodiments, the exact nature and scope of the invention is defined in the following claims.

What is claimed is:

1. Method for making slant fringe holograms having increased efficiency comprising:
    applying a single layer of light sensitive holographic recording medium to a single surface of a substrate;
    treating said layer to reduce light sensitivity at only surface regions thereof adjacent said single surface of said substrate, said treating comprising exposing the medium to highly absorbed incoherent light; and
    exposing the recording medium to coherent light to record a slant fringe pattern therein.

2. The method of claim 1 wherein the medium is dichromated gelatin and the incoherent light is at a wavelength of about 3660 Angstroms.

3. The method of claim 1 wherein the medium includes dye which promotes absorbance of said incoherent light.

4. The method of claim 1 wherein the medium is applied to a thickness of about 6-25 microns.

5. Method for making slant fringe holograms having increasing efficiency comprising:
    applying a single layer of light sensitive holographic recording medium to a single surface of a substrate;
    exposing the medium to highly absorbed incoherent light to reduce light sensitivity at only surface regions thereof adjacent said substrate; and
    exposing the recording medium to coherent light to record a slant fringe pattern therein.

6. Method for increasing efficiency in slant fringe holograms comprising:
applying a single layer of light sensitive holographic recording medium to a single surface of a substrate;
treating said layer to reduce light sensitivity at only surface regions thereof adjacent said single surface of said substrate, said treating comprising exposing the medium to highly absorbed incoherent light;
exposing the recording medium to coherent light to record a slant fringe pattern therein; and
swelling the recording medium.

7. The method of claim 6 wherein the medium is dichromated gelatin and the incoherent light is at a wavelength of about 3660 Angstroms.

8. The method of claim 6 wherein the medium includes dye which promotes absorbance of said incoherent light.

9. The method of claim 6 wherein the medium is applied to a thickness of about 6-25 microns.

10. Method for making slant fringe holograms having increasing efficiency comprising:
applying a single layer of light sensitive holographic recording medium to a single surface of substrate;
exposing the recording medium to coherent light to record a slant fringe pattern therein; and
exposing the medium to highly absorbed incoherent light to reduce light sensitivity at only surface regions thereof adjacent said substrate.

11. A slant fringe hologram having increased efficiency comprising a substrate and a single layer of holographic recording mounted on a single surface of said substrate, said layer having a slant fringe pattern recorded therein, the fringe pattern at only surface regions of the medium adjacent the surface of the substrate being substantially reduced in contrast from the fringe pattern in the interior of the holographic medium.

* * * * *